United States Patent
Farnsworth

(10) Patent No.: US 11,724,706 B2
(45) Date of Patent: Aug. 15, 2023

(54) PRECONDITIONING A FUEL CELL USING ROUTE DATA

(71) Applicant: Toyota Motor Engineering & Manufacturing North America, Inc, Plano, TX (US)

(72) Inventor: Jared Farnsworth, Gardena, CA (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 309 days.

(21) Appl. No.: 17/212,745

(22) Filed: Mar. 25, 2021

(65) Prior Publication Data
US 2022/0306128 A1  Sep. 29, 2022

(51) Int. Cl.
*B60W 50/00* (2006.01)
*H01M 8/04537* (2016.01)
*H01M 8/04701* (2016.01)

(52) U.S. Cl.
CPC .... *B60W 50/0097* (2013.01); *H01M 8/04552* (2013.01); *H01M 8/04723* (2013.01); *H01M 2220/20* (2013.01)

(58) Field of Classification Search
CPC ......... B60W 50/0097; H01M 8/04552; H01M 8/04723; H01M 2220/20
See application file for complete search history.

(56) References Cited

U.S. PATENT DOCUMENTS

| 8,577,547 | B2 | 11/2013 | Logan et al. |
| 9,768,457 | B2 | 9/2017 | Kwon |
| 10,647,212 | B2 | 5/2020 | Matsusue et al. |
| 10,780,787 | B2 | 9/2020 | Bandai et al. |
| 2004/0219397 | A1* | 11/2004 | Lyon ................. H01M 8/04753 429/513 |
| 2004/0219415 | A1* | 11/2004 | Brignone .......... H01M 8/04186 323/318 |
| 2004/0253489 | A1* | 12/2004 | Horgan ............. H01M 8/04947 429/429 |
| 2016/0211670 | A1* | 7/2016 | Nakayama ............... H02M 7/44 |
| 2018/0297483 | A1 | 10/2018 | Pevear et al. |
| 2021/0221256 | A1* | 7/2021 | Uhrig ...................... B60L 58/30 |
| 2022/0238897 | A1* | 7/2022 | Hellmann ......... H01M 8/04014 |
| 2022/0255100 | A1* | 8/2022 | Vallur Rajendran ...................... H01M 8/04753 |

FOREIGN PATENT DOCUMENTS

WO  2016083529 A1  6/2016

* cited by examiner

*Primary Examiner* — Behrang Badii
(74) *Attorney, Agent, or Firm* — Jordan IP Law, LLC

(57) ABSTRACT

Methods and systems may provide for technology to predict a future increase in power demand on a fuel cell based on route data associated with a vehicle powered by the fuel cell and reduce an operating temperature of the fuel cell prior to the future increase in power demand. The technology may also provide supplemental power from a battery to the vehicle while the operating temperature of the fuel cell is being reduced.

20 Claims, 2 Drawing Sheets

PRECONDITIONING A FUEL CELL USING ROUTE DATA

TECHNICAL FIELD

Embodiments generally relate to fuel cells. More particularly, embodiments relate to using route data to precondition a fuel cell.

BACKGROUND

Fuel cells may be used to power electric vehicles (EVs) in a manner that reduces greenhouse gas emissions. Road conditions, however, such as steep uphill grades, may place a high power demand on EV fuel cells. Moreover, the high power demand may cause the fuel cell to overheat, which reduces the performance of the fuel cell.

BRIEF SUMMARY

In one embodiment, a power subsystem includes a fuel cell, a battery, and a controller coupled to the fuel cell and the battery, the controller including stored instructions, which when executed by the controller, cause the controller to predict a future increase in power demand on the fuel cell based on route data associated with a vehicle powered by the fuel cell, reduce an operating temperature of the fuel cell prior to the future increase in power demand, and provide supplemental power from the battery to the vehicle while the operating temperature of the fuel cell is being reduced.

In another embodiment, at least one computer readable storage medium comprises a set of instructions, which when executed by a controller, cause the controller to predict a future increase in power demand on a fuel cell based on route data associated with a vehicle powered by the fuel cell, reduce an operating temperature of the fuel cell prior to the future increase in power demand, and provide supplemental power from a battery to the vehicle while the operating temperature of the fuel cell is being reduced.

In yet another embodiment, a method comprises predicting a future increase in power demand on a fuel cell based on route data associated with a vehicle powered by the fuel cell, reducing an operating temperature of the fuel cell prior to the increase in power demand, and providing supplemental power from a battery to the vehicle while the operating temperature of the fuel cell is being reduced.

BRIEF DESCRIPTION OF THE SEVERAL VIEWS OF THE DRAWINGS

The various advantages of the embodiments will become apparent to one skilled in the art by reading the following specification and appended claims, and by referencing the following drawings, in which:

DETAILED DESCRIPTION

Figure 1:
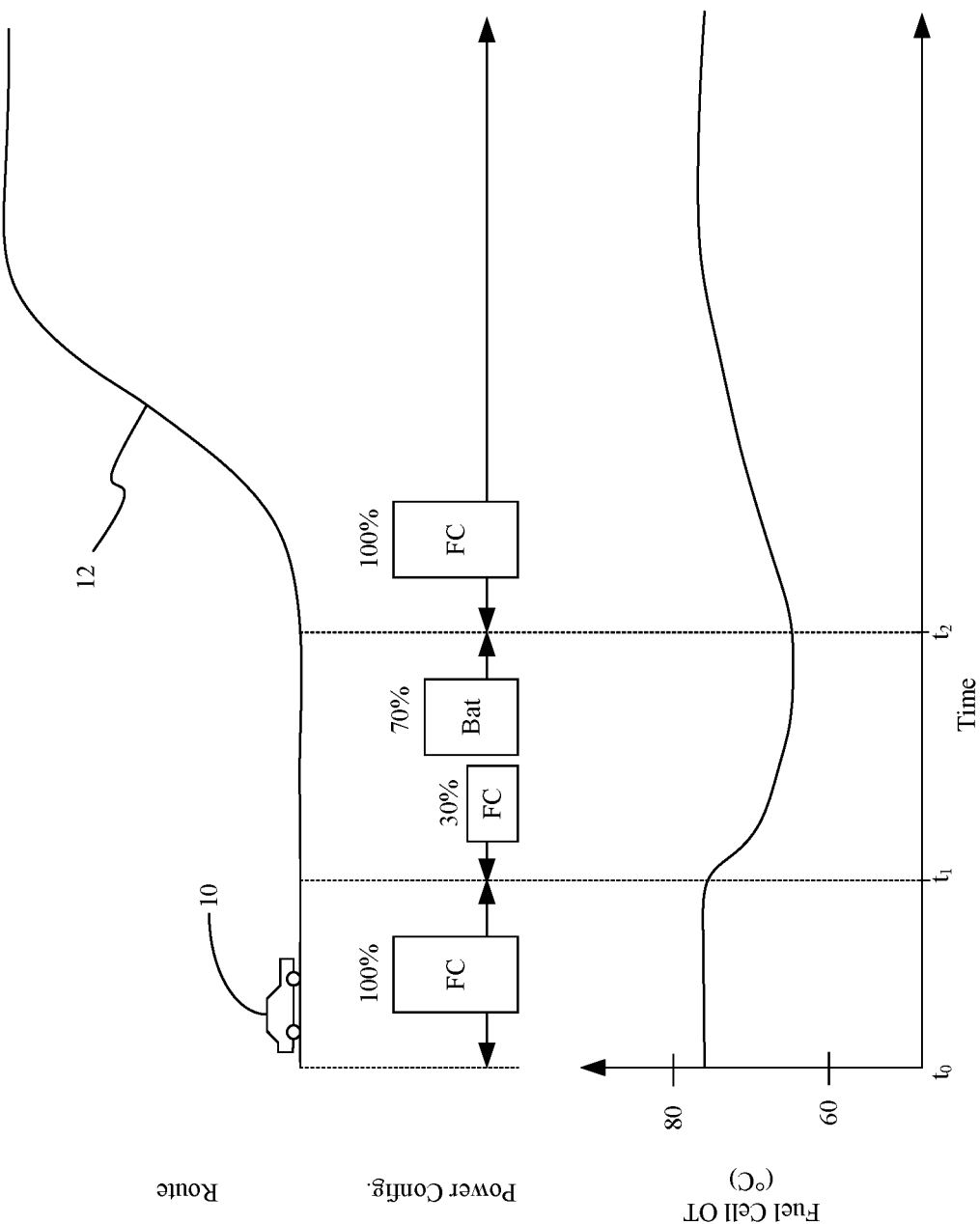
FIG. 1 is an illustration of an example of a route, a power configuration, and a fuel cell operating temperature (OT) curve according to an embodiment.

Turning now to FIG. 1, an electric vehicle 10 is shown traveling on a route that includes an upcoming incline 12 (e.g., steep uphill grade). In an embodiment, the electric vehicle 10 is initially powered solely by a fuel cell (FC, e.g., hydrogen-based) from a time $t_0$ to a time $t_1$. The electric vehicle 10 may automatically detect the upcoming incline 12 based on route data such as, for example, crowd sourced eHorizon map data received via a wireless link. In general, the upcoming incline 12 may increase the power demand on the fuel cell, where the increased power demand could cause the operating temperature of the fuel cell to exceed an upper limit (e.g., 80° C.) of an optimal/target range (e.g., 60-80° C.).

Accordingly, the electric vehicle 10 may predict the future increase in power demand on the fuel cell (e.g., power demand event) based on the route data and reduce the operating temperature of the fuel cell prior (e.g., beginning at time $t_1$) to the future increase in power demand. The operating temperature of the fuel cell may be reduced by providing additional cooling (e.g., liquid and/or convection cooling) to the fuel cell, reducing the air inlet temperature of the fuel cell, and so forth. In an embodiment, the electric vehicle 10 also provides supplemental power from a battery to the vehicle 10 while the operating temperature of the fuel cell is being reduced. In the illustrated example, the fuel cell provides 30% of the total output power and the battery provides 70% of the total output power during the period from time $t_1$ to $t_2$ (e.g., the preconditioning period).

Regarding temperature safety limits, fuel cells and batteries have different requirements and limitations. Typically, fuel cells can operate at a higher temperature than batteries. A challenge is that fuel cells generate more heat than batteries and due to the relatively low temperature (<100° C.) of fuel cells and radiator size packaging limitations, it may be difficult to reject the heat. Since batteries generate less heat for the same amount of power (e.g., are more efficient), and battery cooling systems can be sized and packaged more easily, the temperature rise rate for batteries can be slower than fuel cells (e.g., using current state of the art cooling technology).

A main metric being controlled is how long a device can generate a specific power load before limiting. This metric is a function of the generated heat (e.g., efficiency), the cooling system heat rejection capability, and the difference between the current temperature and the upper safety limit. See the simplified general equation below:

$$V_{eq} \rho_{eq} c_{eq} \frac{dT}{dt} = Q_{Heat} + Q_{Cooling} \qquad (1)$$

where dt is the change in time, dT is the change is temperature, $Q_{Heat}$ is positive, and $Q_{Cooling}$ is negative.

Assuming the battery cannot provide sufficient sustained power to complete the upcoming incline 12 due to a limitation (e.g., insufficient peak power, insufficient capacity, etc.), the fuel cell will operate at a minimum sustained power for the vehicle 10 to complete the route without limiting performance. Accordingly, the control attempts to optimize the fuel cell temperature equation (1) so that the fuel cell can provide the required sustained power long enough for the vehicle 10 to complete the upcoming incline 12 along the route without limitation.

Equation (1) can be rearranged to solve for the target starting fuel cell temperature at the start of the incline 12:

$$V_{eq} \rho_{eq} c_{eq} \frac{(T_{Limit} - T_{target})}{dt_{target}} = Q_{Heat} + Q_{Cooling} \rightarrow \qquad (2)$$

-continued $$T_{target} = T_{Limit} - \frac{Q_{Heat} + Q_{Cooling}}{V_{eq}\rho_{eq}c_{eq}} dt_{target} \qquad (3)$$

where $dt_{target}$ is how long the fuel cell will need to provide the required FC power and therefore generate heat ($Q_{Heat}$) at an estimated cooling performance ($Q_{cooling}$) to prevent the coolant temperature from exceeding the upper temperature limit ($T_{Limit}$).

Accordingly, there are several additional operations associated with this calculation:

1) Before: calculate the required FC power to complete the incline 12. This operation considers the state and capability of the battery as well as the route requirements.
2) After: using same equation, calculate the battery power required to reduce the FC power (e.g., heat) and to reduce the FC temperature before the start of the incline 12.

Thus, even though the state of charge of the battery may decrease during the preconditioning period, the battery is able to support the load of the electric vehicle 10 without overtemperature or overpower concerns. The length of the preconditioning period, as well as the amount of additional cooling and supplemental power to be provided may be determined based on one or more factors such as, for example, the steepness of the incline 12, the initial operating temperature of the fuel cell, the initial charge level of the battery, etc., or any combination thereof.

In the illustrated example, additional cooling and supplemental power causes the operating temperature of the fuel cell to approach the lower limit of the target range slightly before the electric vehicle 10 reaches the incline 12. At time $t_2$, the electric vehicle 10 switches back to 100% use of the fuel cell, which is able to support the load of the electric vehicle 10 throughout the incline 12 without exceeding the upper limit of the target range. Thus, the electric vehicle 10 reaches the beginning of the incline 12 with a cooler fuel cell that can perform better on the incline 12 with more power or less degradation. The illustrated approach therefore enhances the performance and durability of the fuel cell.

Figure 2:
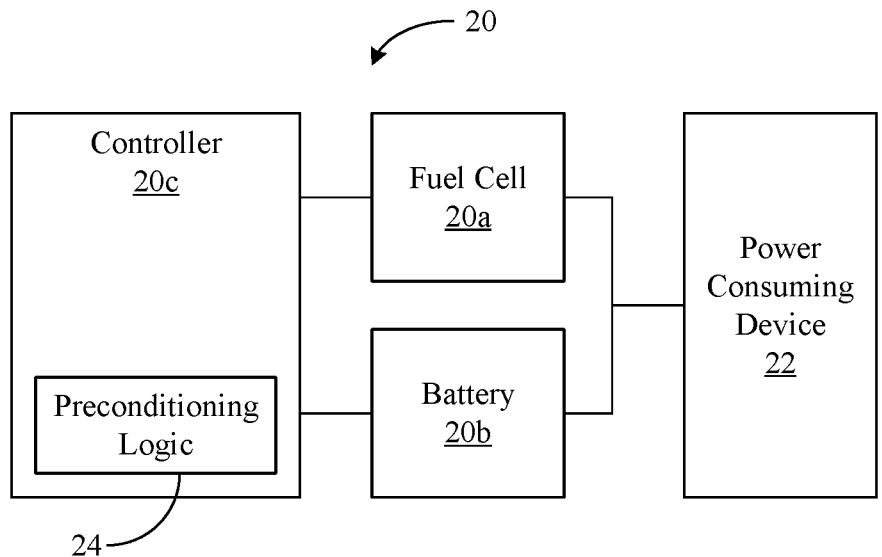
FIG. 2 is a block diagram of an example of a power subsystem according to an embodiment.

FIG. 2 shows a power subsystem 20 (20a-20c) that is coupled to a power consuming device 22 (e.g., vehicle traction motor and/or driveshaft). In an embodiment, the power subsystem 20 includes a fuel cell 20a, a battery 20b, and a controller 20c. In an embodiment, the fuel cell 20a includes two electrodes—a negative electrode (e.g., anode) and a positive electrode (e.g., cathode)—sandwiched around an electrolyte. A fuel, such as hydrogen (e.g., $H_2$), may be injected to the anode and air may be fed to the cathode. If hydrogen is used as the fuel, a catalyst at the anode separates hydrogen molecules into protons and electrons, which take different paths to the cathode. In one example, the electrons pass through an external circuit (e.g., direct current to direct current/DC-DC converter, inverter, etc.) that provides power to the power consuming device 22 (e.g., load). Additionally, the protons may migrate through the electrolyte to the cathode and unite with oxygen and the electrons to produce water and heat.

The illustrated controller 20c includes preconditioning logic 24 (e.g., logic instructions, configurable logic, fixed-functionality hardware logic, etc., or any combination thereof) that causes the controller 20c to predict a future increase in power demand on the fuel cell 20a based on route data associated with a vehicle powered by the fuel cell 20a and reduce an operating temperature of the fuel cell 20a prior to the predicted future increase in power demand. The preconditioning logic 24 may also cause the controller 20c to provide supplemental power from the battery 20b to the vehicle while the operating temperature of the fuel cell is being reduced. The illustrated power subsystem 20 therefore enhances performance and/or durability at least to the extent that reducing the operating temperature of the fuel cell 20a and providing supplemental power from the battery 20b prevents the fuel cell 20a from overheating and extends the life of the fuel cell 20a.

Figure 3:
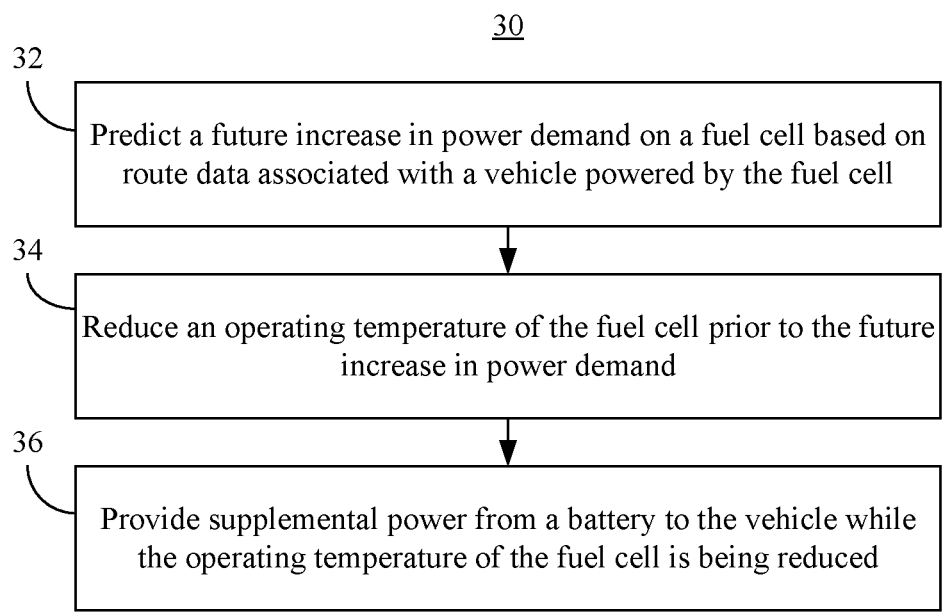
FIG. 3 is a flowchart of an example of a method of operating a performance enhanced controller according to an embodiment.

FIG. 3 shows a method 30 of operating a controller such as, for example, the controller 20c (FIG. 2), already discussed. The method 30 may be implemented in logic instructions (e.g., software), configurable logic, fixed-functionality hardware logic, etc., or any combination thereof. Illustrated processing block 32 predicts a future increase in power demand on a fuel cell based on route data (e.g., crowd sourced data indicating an upcoming incline, decline, traffic, rugged terrain, etc.) associated with a vehicle powered by the fuel cell. In an embodiment, block 34 reduces an operating temperature of the fuel cell prior to the future increase in power demand. Block 34 may include, for example, providing additional cooling to the fuel cell, reducing the inlet temperature of the fuel cell, etc., or any combination thereof. Additionally, block 36 provides supplemental power from a battery (e.g., rechargeable battery) to the vehicle while the operating temperature of the fuel cell is being reduced.

In an embodiment, the reduced operating temperature and the supplemental power cause the fuel cell to remain within a target range of operating temperatures while the fuel cell is experiencing the future increase in power demand (e.g., while the vehicle is on the incline). As already noted, the timing of blocks 34 and 36, as well as the amount of additional cooling and supplemental power to be provided may be determined based on the steepness of the incline, the initial operating temperature of the fuel cell, the initial charge level of the battery, and so forth.

In one example, providing the supplemental power to the vehicle causes the state of charge of the battery to decrease. The battery capacity and power output, however, may be sufficient to supplement fuel cell power demand before reaching safety limits. The illustrated method 30 therefore enhances performance and/or durability at least to the extent that reducing the operating temperature of the fuel cell and providing supplemental power from the battery prevents the fuel cell from overheating and extends the life of the fuel cell.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments set forth herein can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

I claim:

1. A power subsystem comprising:
 a fuel cell;
 a battery; and
 a controller coupled to the fuel cell and the battery, the controller including stored instructions, which when executed by the controller, cause the controller to:
  predict a future increase in power demand on the fuel cell based on route data associated with a vehicle powered by the fuel cell,
  reduce an operating temperature of the fuel cell prior to the future increase in power demand, and
  provide supplemental power from the battery to the vehicle while the operating temperature of the fuel cell is being reduced.

2. The power subsystem of claim 1, wherein the reduced operating temperature and the supplemental power are to cause the fuel cell to remain within a target range of operating temperatures while the fuel cell is experiencing the future increase in power demand.

3. The power subsystem of claim 1, wherein to reduce the operating temperature of the fuel cell, the instructions, when executed, cause the controller to provide additional cooling to the fuel cell.

4. The power subsystem of claim 1, wherein to reduce the operating temperature of the fuel cell, the instructions, when executed, cause the controller to reduce an inlet temperature of the fuel cell.

5. The power subsystem of claim 1, wherein providing the supplemental power to the vehicle causes a state of charge of the battery to decrease.

6. The power subsystem of claim 1, wherein the reduced operating temperature and the supplemental power are to prevent the fuel cell from reaching one or more safety limits.

7. The power subsystem of claim 1, wherein the route data is to indicate an upcoming incline.

8. At least one computer readable storage medium comprising a set of instructions, which when executed by a controller, cause the controller to:
 predict a future increase in power demand on a fuel cell based on route data associated with a vehicle powered by the fuel cell;
 reduce an operating temperature of the fuel cell prior to the future increase in power demand; and
 provide supplemental power from a battery to the vehicle while the operating temperature of the fuel cell is being reduced.

9. The at least one computer readable storage medium of claim 8, wherein the reduced operating temperature and the supplemental power are to cause the fuel cell to remain within a target range of operating temperatures while the fuel cell is experiencing the future increase in power demand.

10. The at least one computer readable storage medium of claim 8, wherein to reduce the operating temperature of the fuel cell, the instructions, when executed, cause the controller to provide additional cooling to the fuel cell.

11. The at least one computer readable storage medium of claim 8, wherein to reduce the operating temperature of the fuel cell, the instructions, when executed, cause the controller to reduce an inlet temperature of the fuel cell.

12. The at least one computer readable storage medium of claim 8, wherein providing the supplemental power to the vehicle causes a state of charge of the battery to decrease.

13. The at least one computer readable storage medium of claim 8, wherein the reduced operating temperature and the supplemental power are to prevent the fuel cell from reaching one or more safety limits.

14. The at least one computer readable storage medium of claim 8, wherein the route data is to indicate an upcoming incline.

15. A method comprising:
 predicting a future increase in power demand on a fuel cell based on route data associated with a vehicle powered by the fuel cell;
 reducing an operating temperature of the fuel cell prior to the future increase in power demand; and
 providing supplemental power from a battery to the vehicle while the operating temperature of the fuel cell is being reduced.

16. The method of claim 15, wherein the reduced operating temperature and the supplemental power cause the fuel cell to remain within a target range of operating temperatures while the fuel cell is experiencing the future increase in power demand.

17. The method of claim 15, wherein reducing the operating temperature of the fuel cell includes providing additional cooling to the fuel cell.

18. The method of claim 15, wherein reducing the operating temperature of the fuel cell includes reducing an inlet temperature of the fuel cell.

19. The method of claim 15, wherein providing the supplemental power to the vehicle causes a state of charge of the battery to decrease.

20. The method of claim 15, wherein the reduced operating temperature and the supplemental power prevent the fuel cell from reaching one or more safety limits.

* * * * *